United States Patent
Uan-Zo-Li

(10) Patent No.: US 9,112,416 B2
(45) Date of Patent: Aug. 18, 2015

(54) AC ADAPTER FOR ELECTRONIC DEVICE

(71) Applicant: INTEL CORPORATION, Santa Clara, CA (US)

(72) Inventor: Alexander B. Uan-Zo-Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 13/722,055

(22) Filed: Dec. 20, 2012

(65) Prior Publication Data

US 2014/0176048 A1    Jun. 26, 2014

(51) Int. Cl.
*H02M 1/00* (2006.01)
*H02M 3/335* (2006.01)
*H02J 7/02* (2006.01)

(52) U.S. Cl.
CPC ............ *H02M 3/33507* (2013.01); *H02J 7/02* (2013.01); *H02M 2001/0096* (2013.01)

(58) Field of Classification Search
None
See application file for complete search history.

(56) References Cited

U.S. PATENT DOCUMENTS

| | | | | |
|---|---|---|---|---|
| 5,864,457 | A * | 1/1999 | Kates et al. | 361/111 |
| 6,300,744 | B1 * | 10/2001 | Shum | 320/137 |
| 6,465,913 | B1 * | 10/2002 | Nagai et al. | 307/85 |
| 7,714,533 | B2 * | 5/2010 | Odaohhara | 320/106 |
| 8,239,696 | B2 * | 8/2012 | Zhao | 713/300 |
| 8,508,079 | B1 * | 8/2013 | Corrado | 307/131 |
| 8,854,849 | B2 * | 10/2014 | Kobeda et al. | 363/74 |
| 2009/0230919 | A1 * | 9/2009 | Nethken | 320/115 |
| 2010/0289457 | A1 * | 11/2010 | Onnerud et al. | 320/162 |
| 2012/0256597 | A1 * | 10/2012 | Miyamoto | 320/137 |

* cited by examiner

*Primary Examiner* — Leigh Garbowski
(74) *Attorney, Agent, or Firm* — KED & Associates LLP

(57) ABSTRACT

An electronic device may include an alternating current (AC) adapter to receive AC power and to provide a direct current (DC) voltage. The AC adapter may include a transistor and a capacitor. The capacitor to store a voltage based on the received AC power, and the transistor to remove a portion of the power stored in the capacitor based on the received AC power.

25 Claims, 4 Drawing Sheets

AC ADAPTER FOR ELECTRONIC DEVICE

BACKGROUND

1. Field

Embodiments may relate to an alternating current (AC) adapter for an electronic device, such as a mobile device.

2. Background

Mobile devices are becoming smaller in size and weight. However, AC adapters for mobile devices are not seeing a comparable decrease in size or weight.

BRIEF DESCRIPTION OF THE DRAWINGS

Arrangements and embodiments may be described in detail with reference to the following drawings in which like reference numerals refer to like elements and wherein.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

The following may relate to a sinusoidal AC input voltage. An input AC voltage may be considered as being low or high. The determination of low or high may be made based on an absolute value of the input AC voltage.

Figure 1:
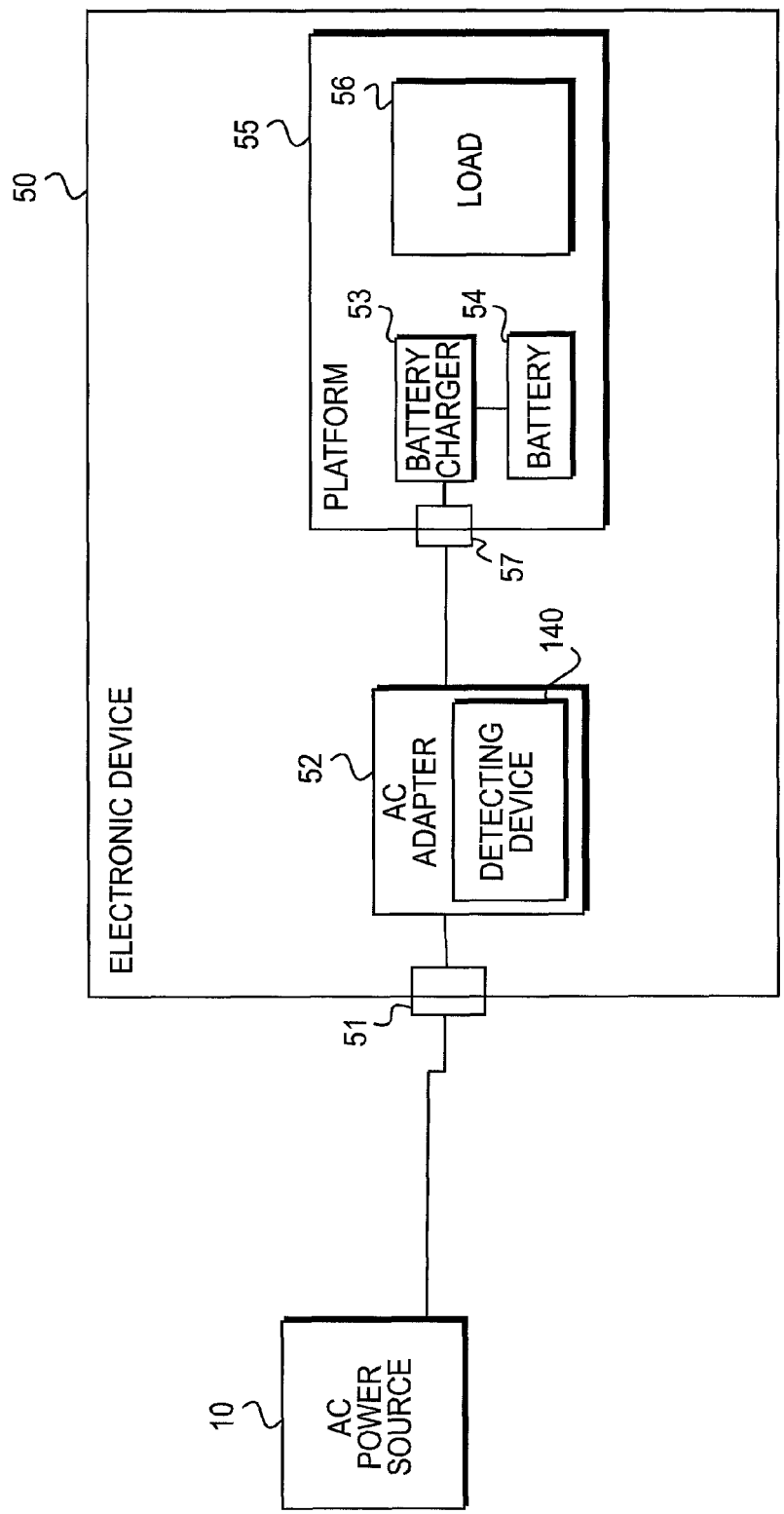
FIG. 1 is a diagram of an electronic device to be powered by an AC power source.

FIG. 1 shows an electronic device to be powered by an AC adapter according to an example embodiment. Other embodiments and configurations may also be provided.

More specifically, FIG. 1 shows an electronic device 50 directly coupled to an alternating current (AC) power source 10. The AC power source 10 may provide AC power to an AC adapter 52, which may provide direct current (DC) for the electronic device 50. The received power may be used to power components of the electronic device 50. The received power may also be stored in a battery provided in a battery port of the electronic device 50.

The electronic device 50 may be a mobile terminal, a mobile device, a mobile computing platform, a laptop computer, a tablet, an ultra-mobile personal computer, a mobile Internet device, a smartphone, a personal digital assistant, a television (TV) set, a monitor and/or etc. Other electronic devices may also be used.

The electronic device 50 may include an input port 51, an AC adapter 52, and a platform 55 that includes an input port 57, a battery charger 53, a battery port to receive a battery 54 (or other charge storage device) and a load 56.

The load 56 may be any device or component on the electronic device 50 (or coupled to the electronic device 50) that operates based on a received voltage. For example, the load 56 may be a display device, a memory, a processor, a controller, an input/output device, etc.

FIG. 1 shows the AC adapter 52 as being internal to the electronic device 50. However, the AC adapter 52 may also be external (and separate) to the electronic device 50.

The AC power source 10 may provide an AC voltage (or AC power) to the input port 51, which in turn provides the AC voltage to the AC adapter 52. The AC adapter 52 may convert the received AC voltage to a DC voltage. The AC adapter 52 may also be considered an AC/DC adapter or an AC/DC converter.

If the AC adapter 52 is external to the electronic device 50, then the AC adapter 52 may receive an AC voltage from the AC power source 10 and provide a DC voltage to the input port 57 (and to the battery charger 53 or directly to the battery 54). For ease of description, the following description may relate to the AC adapter being internal to the electronic device 50.

The DC voltage may be provided from the input port 57 to the battery charger 53. The battery charger 53 may provide the DC voltage to the battery 54 (provided at the battery port). The DC voltage may also, or alternatively, be provided to the load 56 (directly or indirectly via the battery charger 53) so as to operate the electronic device 50. For example, the DC voltage may be used to power a display device (or other component) on the electronic device 50. A voltage regulator may also be provided on the platform 55 of the electronic device 50 to stabilize the voltage prior to being provided to a load. The battery 54 may be connected directly to the AC adapter 52 output in one implementation.

The AC adapter 52 may be designed to receive AC power from the AC power source 10 (i.e., an AC outlet) at a specific frequency (such as a low frequency of 50 Hertz (Hz)) and to have a voltage that may vary (such as from 90 Vrms to 265 Vrms) based on a country where the AC adapter 52 is used, for example.

The AC adapter 52 may store a significant amount of energy (or power) in order to filter out a sinusoidal nature of the AC voltage (or power) inputted from the AC power source 10. In at least one disadvantageous arrangement, the AC adapter 52 may include a bulk capacitor, which may be a large component of the AC adapter 52. The bulk capacitor may be specifically designed to smooth a low-frequency oscillation due to AC line frequency (such as 50 Hz or 60 Hz).

As one example, the bulk capacitor may be an electrolytic 100 µF capacitor with a 450 breakdown voltage. The bulk capacitor may be 22 millimeters (mm) in diameter and may have a height of 25 mm, for example. Other parameters and capabilities may also be provided.

The bulk capacitor may store power when an input voltage (of the AC adapter) is at or near the peak. The bulk capacitor may subsequently provide (or deliver) the stored power when the input AC voltage (of the AC adapter) is in a valley (or is low). The peak of the input voltage may be a peak of the sinusoidal AC power, and the valley (or low voltage) of the input voltage may be a valley of the sinusoidal AC power.

Figure 2:
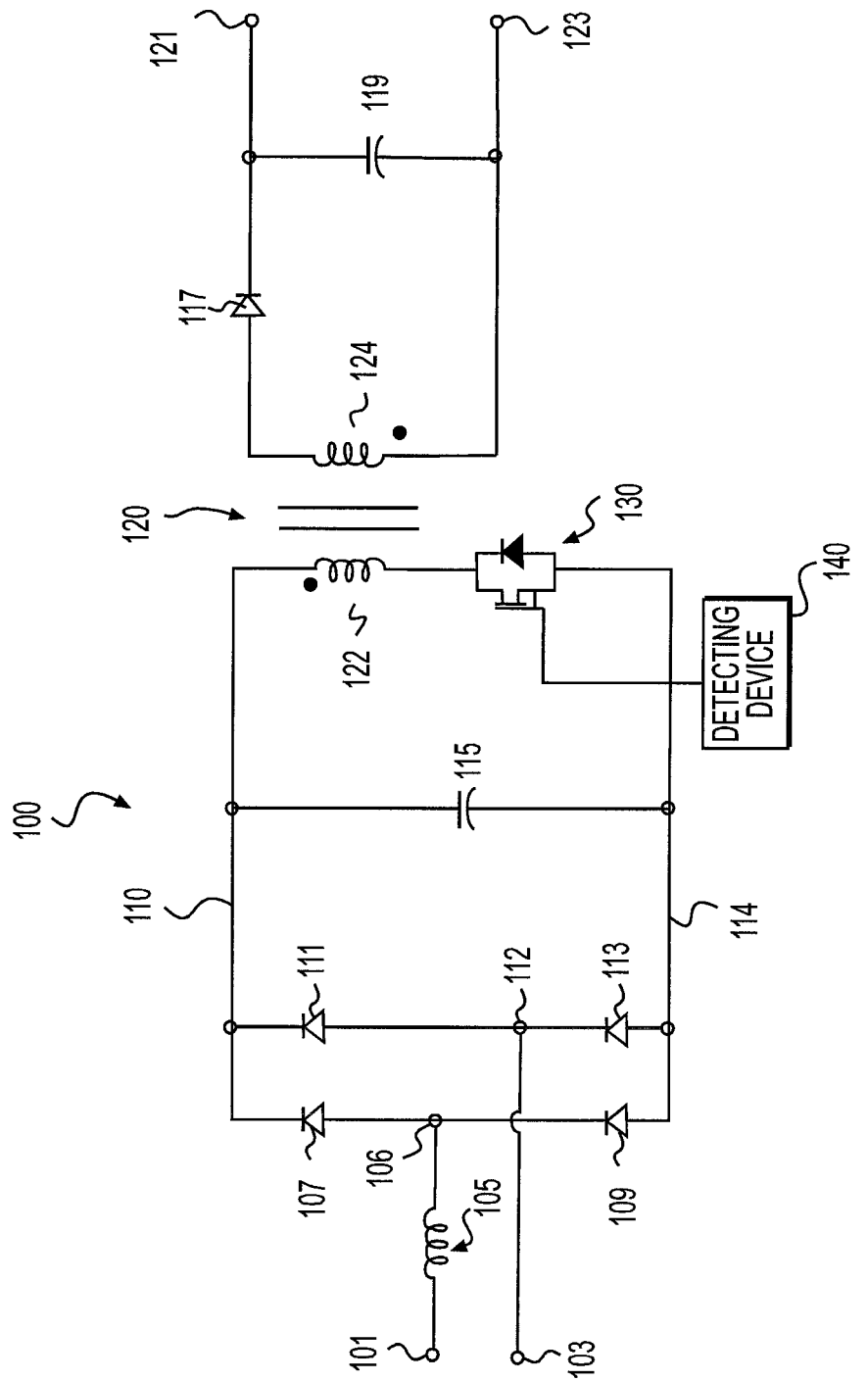
FIG. 2 is a simplified diagram of an AC adapter according to an example embodiment.

FIG. 2 is a simplified diagram of an AC adapter according to an example embodiment. Other embodiments and configurations may also be provided.

More specifically, FIG. 2 shows an AC adapter 100 that may correspond to the AC adapter 52 shown in FIG. 1. The AC adapter 100 (shown in FIG. 2) is merely one example of an AC adapter, as multiple other embodiments and configurations of the AC adapter may also be provided. The AC adapter 100 may be provided internal to the electronic device 50 as shown in FIG. 1.

In at least one embodiment, the AC adapter may be provided external to the electronic device 50.

AC power may be received from the AC power source 10 at input nodes 101, 103 of the AC adapter 100. The AC adapter 100 may provide an adapter output voltage at output nodes 121, 123. The adapter output voltage (at the output nodes 121, 123) may be a DC voltage to be provided to any one of a number of components within the electronic device 50, including the battery charger 53, the battery 54, the load 56 and/or a voltage regulator. The adapter output voltage may also be considered an input voltage (or input DC voltage) to the electronic device (such as a mobile input voltage). The adapter output voltage may be a DC voltage applied to the platform 55 (via the input port 57).

The AC adapter 100 may include components such as an inductor 105, diodes 107, 109, 111, 113, a capacitor 115, a transistor 130 (or switch) and a flyback or forward transformer 120 (or a transformer). The AC adapter 100 may also include a diode 117 and a capacitor 119. Other configurations of the AC adapter 100 may also be provided. For example, the DC portion of the AC adapter 100 may be a buck converter or the capacitor 115 may be connected to the diodes 107, 109, 111 and 113 through a boost converter.

The inductor 105 may be coupled between the input node 101 and a node 106 (between the diode 107 and the diode 109). The inductor 105 may filter out current spikes during a conduction period of the AC power received at the AC adapter 100. The inductor 105 may also be used to lower electromagnetic interference (EMI) of the received AC power. The inductor 105 may also be a common mode transformer connected between nodes 101, 106, 103 and 112.

The input node 103 may be coupled to a node 112 (between the diode 111 and the diode 113).

The diodes 107, 109, 111, 113 may be provided for a full-wave rectification of the input AC voltage (at the input nodes 101, 103). The diode 107 and the diode 109 may be coupled in series between a node 110 and a node 114. The diode 111 and the diode 113 may also be coupled in series between the node 110 and the node 114. The node 114 may correspond to ground (or a ground node).

The capacitor 115 may be coupled between the node 110 and the node 114. The capacitor 115 may be considered a bulk capacitor, responsible for filtering the ripple of the rectifier output due to double line frequency. As one example, in this embodiment, the capacitor 115 may be a 100 µF capacitor and may be smaller or larger in size than the previously described capacitor.

The capacitor 115 may store power when the input AC voltage is low, and the AC adapter 100 may provide pulsating power (such as to the battery 54) when an absolute value of the input AC voltage is high (such as during a peak or a valley of the sinusoidal curve).

The transformer 120 may transform the pulsating voltage of one amplitude to a voltage of another amplitude. The transformer 120 may include a first winding 122 (or coil) and a second winding 124 (or coil). The first winding 122 may be coupled in series with the transistor 130 (or the switch) between the node 110 and the node 114. In at least one embodiment, the transformer may have additional windings either to produce additional voltage outputs and/or to reset the transformer.

The transistor 130 may be a metal-oxide-semiconductor field effect transistor (MOSFET) having a gate. A gate signal may be applied to the gate of the transistor 130 to control the transistor 130, such as turning the transistor 130 on or off. The transistor 130 may control both the storing of power in the capacitor 115 and the providing of the power (to the output nodes 121, 123). As one example, the gate signal may be provided based on a detecting device 140 or a pulse-width modulator.

The diode 117 may be coupled between the second winding 124 (of the transformer 120) and the output node 121. The capacitor 119 may be coupled between the output node 121 and the output node 123. The output node 123 may correspond to ground (or a ground node).

The transistor 130, the transformer 120, the diode 117 and the capacitor 119 may form a flyback converter to provide the adapter output voltage (or input DC voltage to the electronic device) to the output nodes 121, 123.

Figure 3:
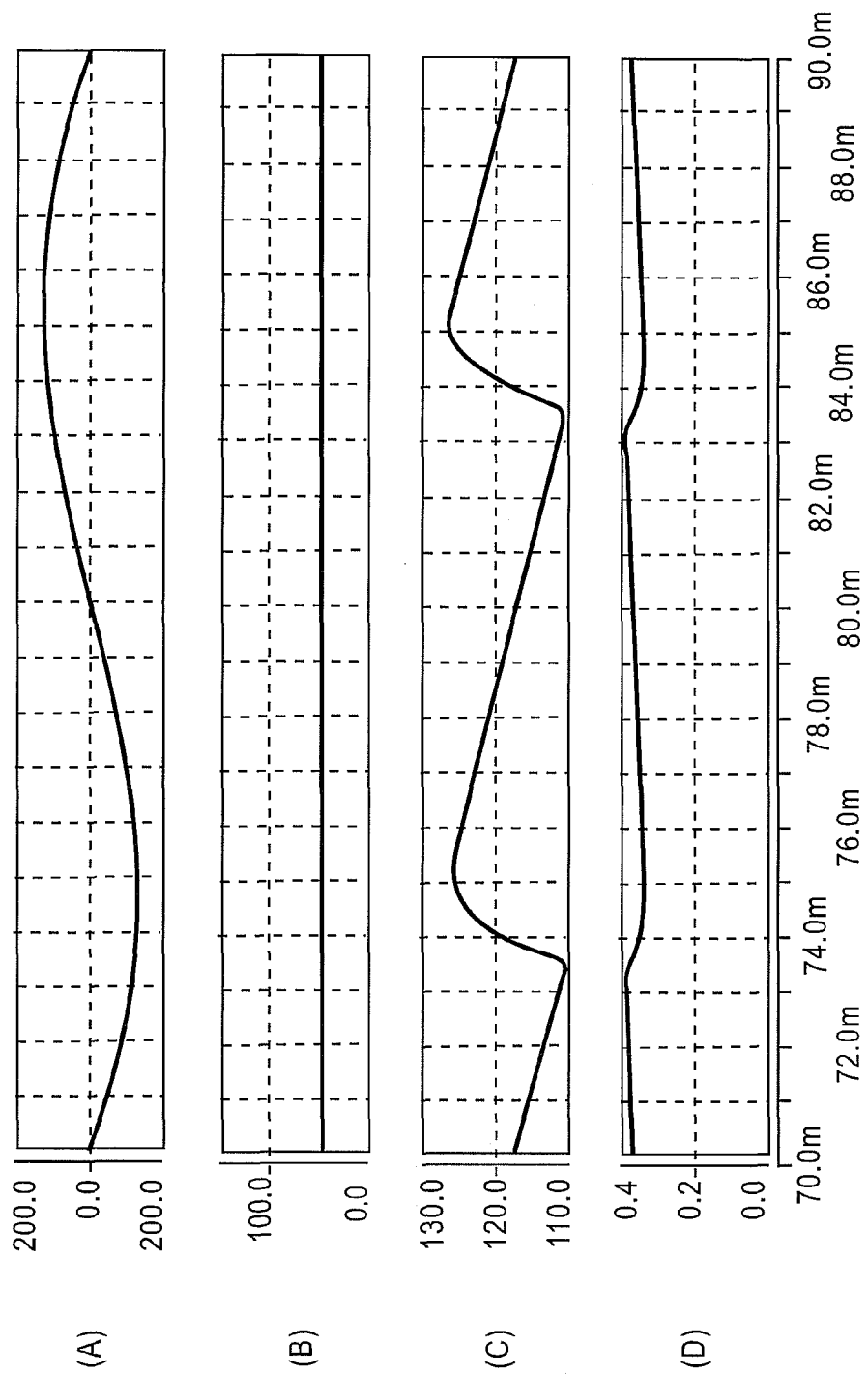
FIG. 3 shows voltage and current waveforms according to an example arrangement.

FIG. 3 shows voltage and current waveforms according to an example arrangement in which an AC adapter uses a large bulk capacitor in an AC adapter.

Graph A shows a waveform of an input AC voltage to the AC adapter 100. As shown, the input AC voltage is a sinusoidal curve that has a peak and a valley. Graph B shows a waveform of the adapter output voltage (at the output nodes 121, 123) when a large bulk capacitor is used (and was designed based on the input AC voltage and the maximum load). Graph C shows a waveform of a voltage of the bulk capacitor. Graph D shows a waveform of a current drawn from the bulk capacitor (when the large bulk capacitor is used in the AC adapter).

Embodiments may utilize the battery 54 (on the platform 55 of the electronic device 50) as an energy storage component (or charge storage device) when an absolute value of the input AC voltage is low (or non-existent). This may allow a size of the AC adapter bulk capacitor to be reduced, which may in turn help reduce an overall size and weight of the electronic device 50.

The battery 54 may be used as the energy storage component and may be used as a low-frequency filter substantially in parallel with the capacitor 115. This may help lower size requirements, and thereby allow the size of the AC adapter to be reduced. Other types of electrical energy storage devices may also be used.

Figure 4:
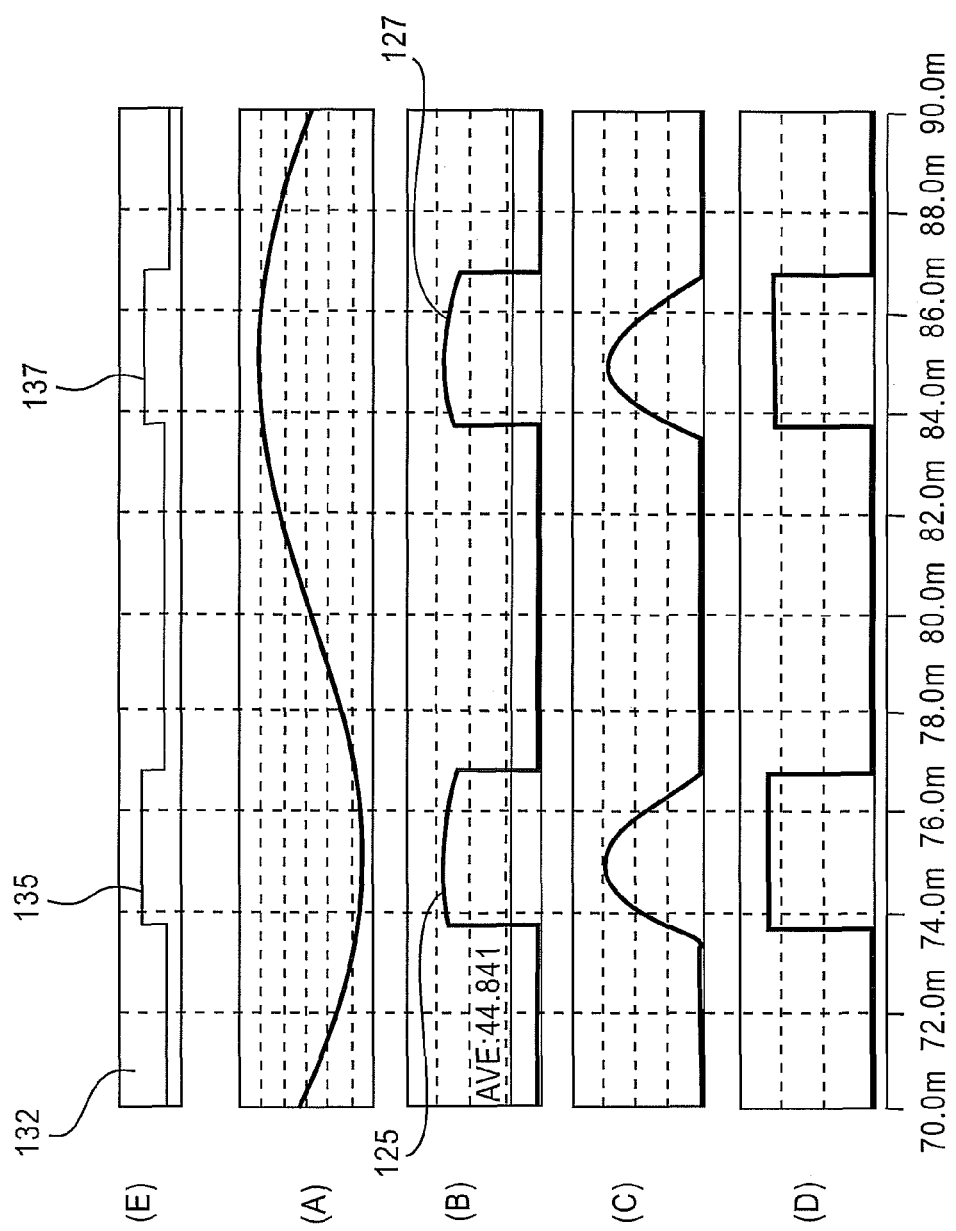
FIG. 4 shows voltage and current waveforms according to an example embodiment.

Embodiments may provide power (or voltage) from the AC adapter 100 in pulses, as will be shown in FIG. 4. Rather than a steady DC power, the AC adapter 100 may provide pulsating power to the system (i.e., the platform 55) during periods when an absolute value of the input AC voltage is high, while the battery 54 (or other storage device) may be providing power to the system during the periods when an absolute value of the input AC voltage is low. The pulsating power may be based on the input AC power (on the input AC line at the input nodes 101, 103). The battery 54 or the load 56 may receive the pulsating power (or DC voltage) at prescribed times based on the AC power received at the AC adapter 100 (via the input port 51). The pulsating power may be provided from the capacitor 115, which obtains the power from the input AC voltage.

The electronic device 50 may include the detecting device 140 to determine when the AC power (input to the AC adapter 100) exceeds a prescribed first value and to determine when the AC power (input to the AC adapter 100) is below a prescribed second value. The detecting device 140 may determine a peak of the input AC power and a valley of the input AC power. The detecting device 140 may provide the gate signal to the transistor 130 (of the AC adapter 100) so as to control the transistor 130. This may allow the power to be provided to the battery 54 and the system (i.e., the platform 55).

The detecting device 140 may be part of the AC adapter 100. The detecting device 140 may stop switching of transistor 130 when the rectified input AC voltage is below a fixed value. The platform 55 may include a detection mechanism (or device) that may disconnect the adapter output from the system and switch the system (or platform) power consumption to the battery 54.

The AC adapter 100 may also include a monitoring device to monitor the input AC voltage. The monitoring device may communicate with the platform 55 to inform the platform 55 when to utilize the power in the battery 54 and/or when to utilize power from the capacitor 115 of the AC adapter 100. For example, the monitoring device may inform the platform 55 to use the power in the battery 54 when an absolute value of the input AC voltage is low (i.e., between the first and second prescribed values). On the other hand, the monitoring device may inform the platform 55 to the use the power in the capacitor 115 when the input AC voltage is greater than the first prescribed value (i.e., in a peak) or when the input AC voltage is less than the second prescribed value (i.e., in a valley). Stated differently, the monitoring device may inform the platform 55 that power in the capacitor 115 may be used when an absolute value of the input AC voltage is greater than a prescribed value.

The monitoring device in the AC adapter 100 may also operate based on the voltage ripple of the bulk capacitor 115, and the monitoring device may disable the gate signal to transistor 130 (or switch) if the voltage on the capacitor 115 drops below a specified value. This value may be adjusted based on the input AC voltage or based on the capacitor 115 average voltage.

The AC adapter 100 may have a fluctuating power such as when the input AC power is greater than the first prescribed value (i.e., in a peak) or when the input AC power is less than the second prescribed value (i.e., in a valley).

The AC adapter 100 may provide pulsating power to the platform 55 at prescribed times based on the input AC voltage (or the absolute value of the input AC voltage). The battery 54 may supplement the AC adapter when the AC voltage is low. The battery 54 may substitute for the capacitor 119 or be connected in parallel to the capacitor 119 in some implementations.

FIG. 4 shows voltage and current waveforms according to an example embodiment. Other embodiments and configurations may also be provided. The graphs or waveforms in FIG. 4 relate to a smaller capacitor being used in the AC adapter 100 as compared to the bulk capacitor discussed above with respect to FIG. 3.

Graph A shows a waveform of an input AC voltage to the AC adapter 100. As shown, the input voltage is a sinusoidal curve having a peak and a valley. Graph B shows a waveform of the adapter output power (at the output nodes 121, 123). Graph C shows a waveform of a voltage of the capacitor 115. Graph D shows a waveform of current drawn from the capacitor 115 (when a smaller sized capacitor is used in the AC adapter).

Graph E shows when the AC adapter 100 is to provide power to the system (or the platform 55) via the output nodes 121, 123. For example, Graph E shows that power may be provided from the output nodes 121, 123 to the system (or the platform 55) when the signal 132 is high (such as at the time of first and second pulses 135, 137). On the other hand, when the signal 132 is low, then the AC adapter 100 may not provide power from the output nodes 121, 123. The platform 55 may then receive power from the battery 54 (rather than the AC adapter 100).

The gate signal (provided to the transistor 130) may be provided to the gate of the transistor 130, so as to create the waveforms of FIG. 4's Graphs B-D. The waveforms shown in FIG. 4 may be produced based at least in part on operation of the detecting device.

The detecting device may determine specific time periods of the input AC power. For example, the signal 132 may include the first pulse 135 and the second pulse 137. The first pulse 135 may be provided when the input AC power is below a prescribed value. The second pulse 137 may be provided when the input AC power is greater than a prescribed value. This may result in pulsating power being provided to the platform 55. Stated differently, the first and second pulses 135, 137 may correspond to time periods in which an absolute value of the input AC power is greater than a prescribed value.

The AC adapter output power may include the first and second power pulses 125, 127, which may also be called pulsating signals (or pulsating power) that are provided at prescribed times based on the received AC power or the voltage ripple of the bulk capacitor 115. The first and second power pulses 125, 127 (at the adapter output nodes 121, 123) may be provided to the load 56, to the battery 54 or to another storage device (such as via the battery charger 53). Accordingly, the battery 54 (or other storage device) may receive power pulses to charge or recharge battery cells of the battery 54.

The detecting device (or mechanism) may determine specific periods in which the amplitude of the input AC voltage is greater than the prescribed first value or when the input AC voltage is less than the prescribed second value. Stated differently, the detecting device may determine specific periods when an absolute value of the input AC voltage is greater than a prescribed value. The detecting device may provide a gate signal to the gate of the transistor 130 so as to control operations of the transistor 130.

The gating control of the transistor 130 may provide power from the capacitor 115, through the transformer 120 and to the output nodes 121, 123. This output DC voltage may be called a pulsating power or a pulsating signal. The pulsating power may be provided to the load 56 and to the battery 54 of the electronic device 50 (such as via the battery charger 53). The stored battery power may be subsequently used by components of the electronic device 50.

Based on the input AC voltage, power may be stored both in the capacitor 115 of the AC adapter (during portions of sinusoidal wave or in prior modes) and in the battery 54 (during other portions of the sinusoidal wave). A monitoring device may be used to inform the platform 55 to use either power from the AC adapter 100 or power from the battery 54 or both simultaneously. The AC adapter 100 and the platform 55 may communicate regarding whether the platform 55 may receive power from the AC adapter 100 or whether the platform 55 should be powered from the battery 54.

Embodiments have been described with respect to storing power in the battery 54 as a supplement to the AC adapter 100. Power may be stored in any of a number of electrical energy storing devices, such as rechargeable batteries, primary batteries, supercapacitors, fuel cells, etc.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
a load;
a battery port to receive a battery; and
an alternating current (AC) adapter to receive AC power and to provide a direct current (DC) voltage, the AC adapter to include a transistor and a capacitor, the transistor to control storing of power in the capacitor and to control providing of power to the output nodes, the capacitor to store power during a first prescribed time of the received AC power while the AC adapter is not supplying power to the load and the battery is to supply power to the load, and the transistor to provide pulsating power from the AC adapter during a second prescribed time of the received AC power, the second prescribed time being when an absolute value of the received AC power is greater than a predetermined value.

2. The electronic device of claim 1, further comprising a detecting device to determine when the received AC power is greater than a prescribed first value, and to determine when the received AC power is less than a prescribed second value.

3. The electronic device of claim 2, wherein the detecting device to provide a gate signal to the transistor and to control the transistor based at least in part on the gate signal received at the transistor.

4. The electronic device of claim 3, wherein the detecting device to provide the gate signal having a first pulse when the received AC power is determined to be greater than the prescribed first value, and the detecting device to provide the gate signal having a second pulse when the received AC power is determined to be less than the prescribed second value, and the first pulse and the second pulse to be provided during the second prescribed time.

5. The electronic device of claim 4, wherein at least one pulse of the pulsating power is to be provided from the capacitor to the load in response to the first pulse being received at the transistor.

6. The electronic device of claim 4, wherein at least one pulse of the pulsating power is to be provided from the capacitor to the load in response to the second pulse being received at the transistor.

7. The electronic device of claim 1, wherein the battery to be an energy storage to supplement storage by the capacitor, and the battery to be a low-frequency filter in parallel with the capacitor.

8. An electronic device comprising:
a load;
a port to receive a charge storage device;
an input port to receive an alternating current (AC) voltage; and
an alternating current (AC) adapter to receive the AC voltage from the input port, the AC adapter to provide a direct current (DC) voltage at output ports based on the received AC voltage, the AC adapter to include a capacitor to store a first portion of the AC voltage when an absolute value of the received AC voltage is greater than a predetermined value, and a second portion of the received AC voltage is to be provided to the charge storage device when an absolute value of the received AC voltage is less than the predetermined value.

9. The electronic device of claim 8, further comprising a detecting device to determine when the received AC voltage is greater than a prescribed first value, and to determine when the received AC voltage is less than a prescribed second value.

10. The electronic device of claim 9, wherein the detecting device to control when the second portion of the AC voltage is to be provided to the charge storage device based at least in part on the received AC voltage, the prescribed first value and the prescribed second value.

11. The electronic device of claim 10, wherein the detecting device to provide a first pulse when the received AC voltage is determined to be greater than the prescribed first value, and the detecting device to provide a second pulse when the received AC power is determined to be less than the prescribed second value.

12. The electronic device of claim 11, wherein the AC adapter to further include a transistor to receive the first pulse from the detecting device and to receive the second pulse from the detecting device, and the second portion is based at least in part on the received first pulse and the received second pulse.

13. The electronic device of claim 11, wherein the second portion of the received AC voltage is to be provided to the charge storage device in response to the first pulse being received at the transistor.

14. The electronic device of claim 11, wherein the second portion of the received AC voltage is to be provided to the charge storage device in response to the second pulse being received at the transistor.

15. The electronic device of claim 8, wherein the charge storage device to supplement storage by the capacitor, and the charge storage device to be a low-frequency filter in parallel with the capacitor.

16. The electronic device of claim 8, wherein during a first prescribed time of the received AC power, the AC adaptor does not supply power to the load, and during a second prescribed time of the received AC power, the AC adaptor to supply power to the load.

17. The electronic device of claim 16, wherein during the first prescribed time of the received AC power, the charge storage device to supply power to the load.

18. An electronic device comprising:
a load;
a battery port to receive a battery;
a battery charger to charge the battery;
a detecting device to determine when a received alternating current (AC) voltage is greater than a prescribed first value, and to determine when the received AC voltage is below a prescribed second value; and
an alternating current (AC) adapter to receive the AC voltage and to provide a direct current (DC) voltage, the AC adapter to include a capacitor to store a voltage based on the determination of the detecting device, and the AC adapter to provide the DC voltage to the battery based on the determination of the detecting device, wherein during a first prescribed time of the received AC voltage, the AC adaptor does not supply power to the load and the battery to supply power to the load, and during a second prescribed time of the received AC voltage, the AC adaptor to supply pulsating power to the load.

19. The electronic device of claim 18, wherein the detecting device to determine when the received AC voltage is greater than a prescribed first value, and to determine when the received AC voltage is less than a prescribed second value.

20. The electronic device of claim 19, wherein the detecting device to control when the DC voltage is to be provided to the battery based at least in part on the received AC voltage, the prescribed first value and the prescribed second value.

21. The electronic device of claim 20, wherein the detecting device to provide a first pulse when the received AC voltage is determined to be greater than the prescribed first value, and the detecting device to provide a second pulse when the received AC voltage is determined to be less than the prescribed second value, and the first pulse and the second pulse to be provided during the second prescribed time.

22. The electronic device of claim 21, wherein the AC adapter to further include a transistor to receive the first pulse and the second pulse from the detecting device, and an amount of the DC voltage to be provided to the battery is based at least in part on the received first pulse and the received second pulse.

23. The electronic device of claim 21, wherein a portion of the stored voltage is removed from the capacitor when the first pulse is received at the transistor.

24. The electronic device of claim 21, wherein a portion of the stored voltage is removed from the capacitor when the second pulse is received at the transistor.

25. The electronic device of claim 18, wherein the battery to be an energy storage to supplement storage by the capacitor, and the battery to be a low-frequency filter in parallel with the capacitor.

* * * * *